United States Patent [19]

Johnson

[11] Patent Number: 4,596,119

[45] Date of Patent: Jun. 24, 1986

[54] COMPRESSED AIR PROPULSION SYSTEM FOR A VEHICLE

[75] Inventor: John M. Johnson, Amboy, Ind.

[73] Assignee: Earl L. Alderfer, Fort Wayne, Ind.

[21] Appl. No.: 556,085

[22] Filed: Nov. 29, 1983

[51] Int. Cl.[4] ............................................. F15B 11/06
[52] U.S. Cl. ....................................... 60/407; 60/412; 91/275; 180/165; 180/302
[58] Field of Search .......................... 60/370, 407, 412; 180/165, 302; 91/275

[56] References Cited

U.S. PATENT DOCUMENTS

| | | |
|---|---|---|
| 992,661 | 5/1911 | Hautier . |
| 1,380,795 | 6/1921 | Graziano . |
| 1,688,591 | 10/1928 | Mitton . |
| 1,831,983 | 11/1931 | Wheeler . |
| 1,932,698 | 10/1933 | Jose . |
| 3,036,253 | 5/1962 | Bramley ................................ 91/275 |
| 3,379,008 | 4/1968 | Manganard . |
| 3,666,038 | 5/1972 | Hudspeth et al. . |
| 3,688,859 | 9/1972 | Hudspeth et al. . |
| 3,765,180 | 10/1973 | Brown . |
| 3,847,058 | 11/1974 | Manor ................................... 60/370 |
| 3,913,699 | 10/1975 | Dyer . |
| 3,925,984 | 12/1975 | Holleyman . |
| 3,980,152 | 9/1976 | Manor . |
| 3,986,575 | 10/1976 | Eggmann . |
| 4,018,050 | 4/1977 | Murphy . |
| 4,292,804 | 10/1981 | Rogers, Sr. ............................ 60/407 |
| 4,337,842 | 7/1982 | Spangler et al. . |
| 4,355,508 | 10/1982 | Blenke et al. ........................ 60/416 |
| 4,361,204 | 11/1982 | Earle . |
| 4,383,589 | 5/1983 | Fox ....................................... 60/407 |
| 4,404,800 | 9/1983 | Penney ................................. 60/370 |

FOREIGN PATENT DOCUMENTS 2326403 12/1974 Fed. Rep. of Germany .
WO82/00615 3/1982 PCT Int'l Appl. .

Primary Examiner—Robert E. Garrett
Assistant Examiner—John M. Husar
Attorney, Agent, or Firm—Jeffers, Irish & Hoffman

[57] ABSTRACT

A compressed air propulsion system is provided to be adapted for use with a vehicle, and comprises a transaxle mechanism adapted to be mounted to and driven by the vehicle wheels, and an air compressor coupled to the output shaft of the transaxle mechanism to be driven thereby. The air compressor supplies a flow of compressed air to an air distributor system connected to the vehicle engine. The air distributor system comprises a plurality of solenoids connected to the air lines leading to the engine cylinders, and a respective plurality of microswitches are electrically connected to the solenoids to sequentially operate the solenoids for sequentially supplying compressed air to the engine cylinders. The microswitches are sequentially actuated mechanically by a rotor secured to the distributor shaft, which is coupled to the vehicle crankshaft. An accelerator is also provided for controllably varying the flow rate of compressed air to the air distributor system.

7 Claims, 13 Drawing Figures

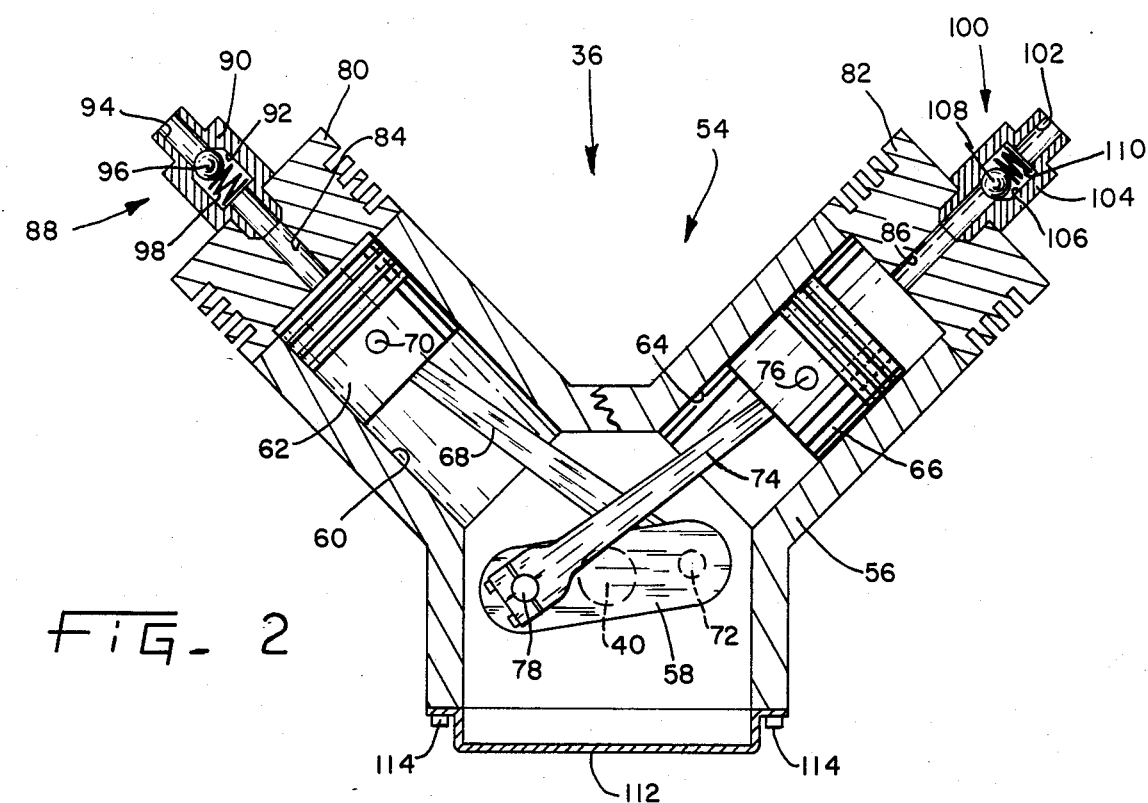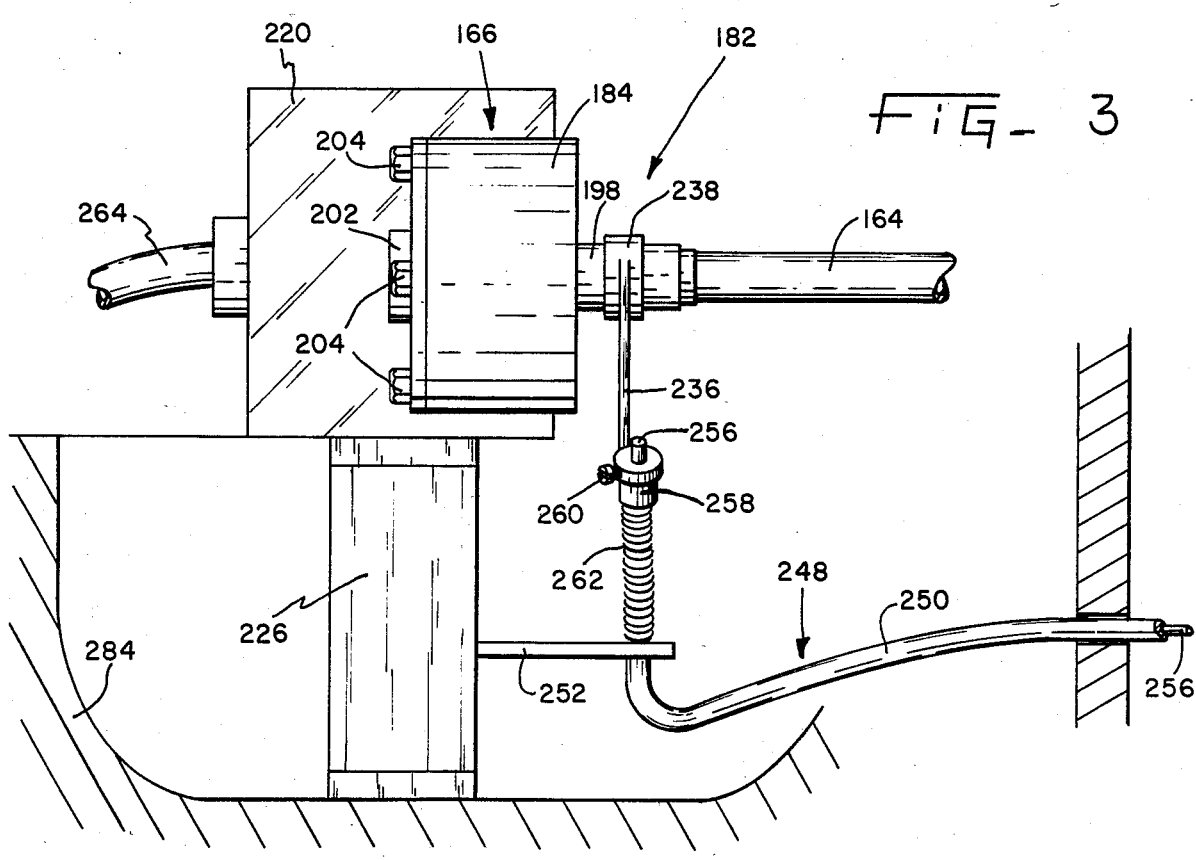

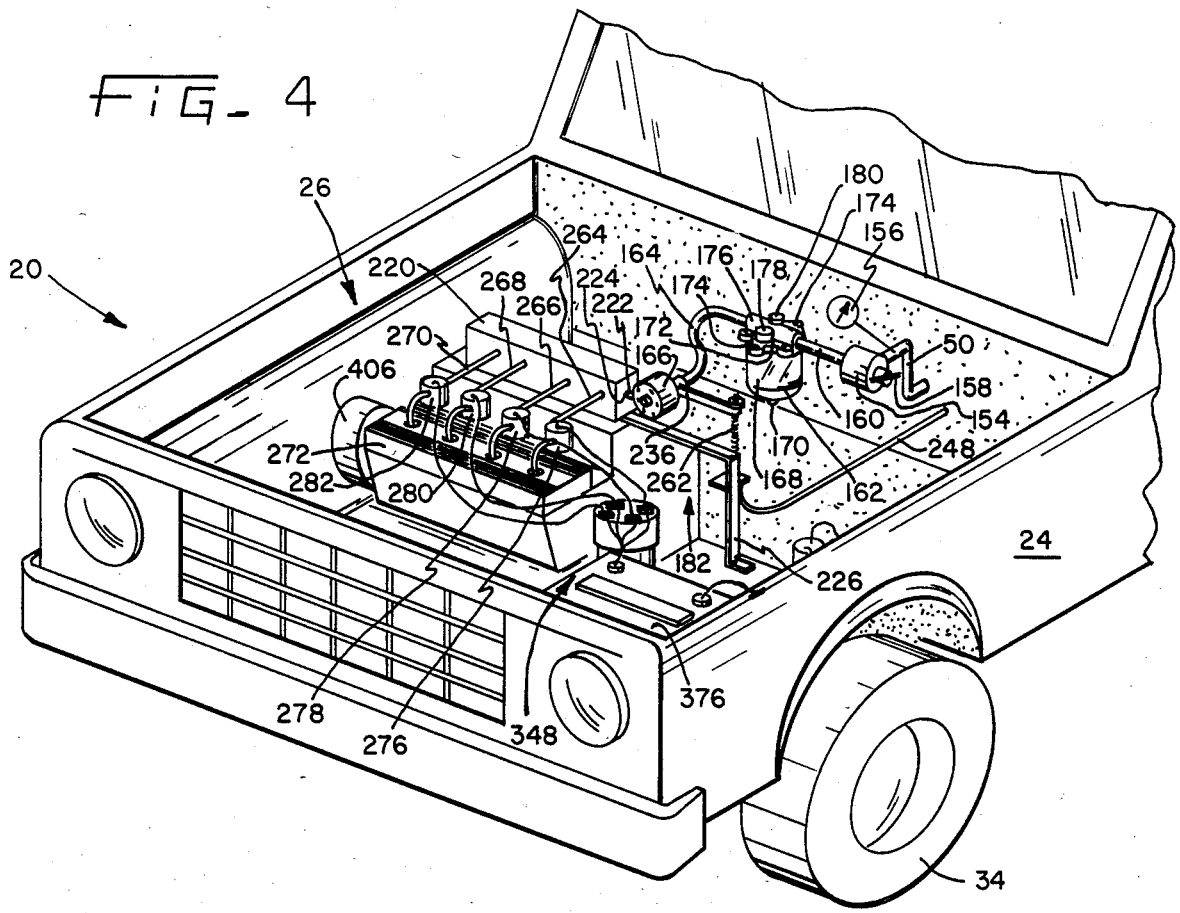
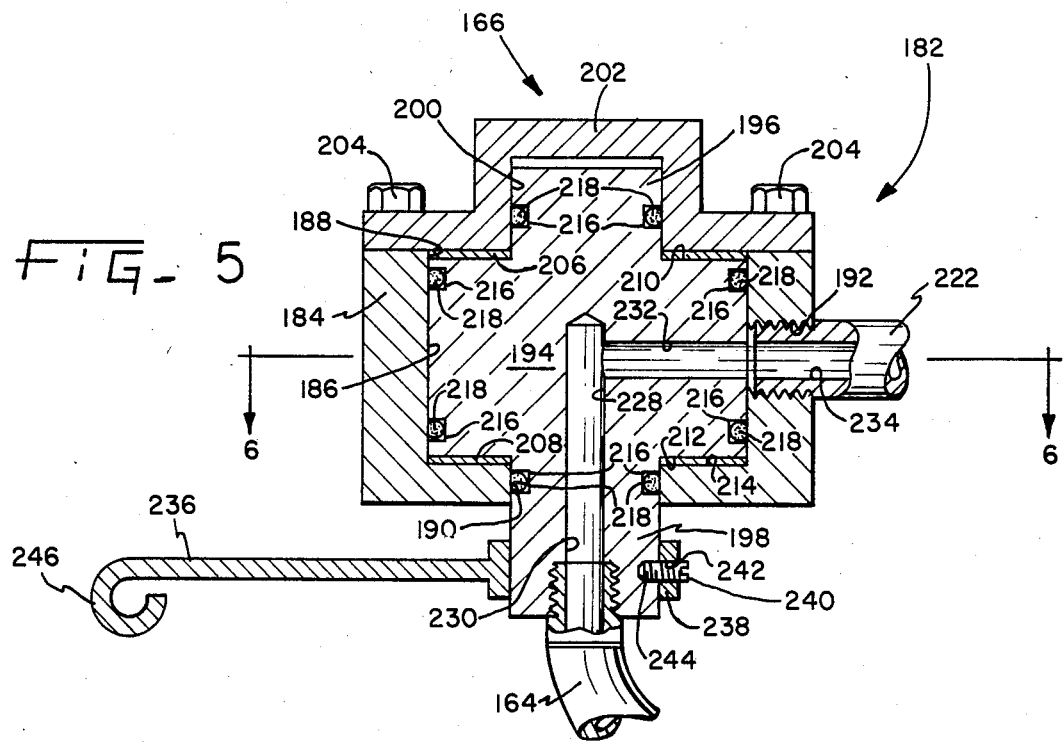

COMPRESSED AIR PROPULSION SYSTEM FOR A VEHICLE

BACKGROUND OF THE INVENTION

This invention pertains to an air propulsion system, and more particularly to an improved compressed air propulsion system for a vehicle.

Many compressed air driven vehicles have been devised in attempting to provide a means of transportation that is inexpensive and pollution free. Most of these vehicles include a conventional engine having a piston-cylinder arrangement connected to a crankshaft, and a conventional, yet complex, valve assembly including camlifters, rocker arms, springs, and the like connected to the crankshaft or camshaft for supplying compressed air to the cylinders to reciprocate the pistons therein. Compressed air is delivered to the cylinders through air lines leading from the supply of compressed air and connected to the intake valves, and is then exhausted through the exhaust valves in the conventional manner.

One of the primary disadvantages with this type of compressed air driven engine is the continued use of the conventional valve assembly operated by the complex arrangement of camlifters, rocker arms, springs, and the like. In any mechanical apparatus, the more moving parts or elements required for the operation of the apparatus, the more complex it becomes and the more susceptible it is to mechanical or material failure.

In still other different types of compressed air driven vehicles, solenoid valves are connected to the air lines leading to the cylinders and are electrically operated to supply and terminate a flow of compressed air. The electrical circuitry operating the solenoids is in someway mechanically related to the rotation of the crankshaft or camshaft. For example, the reciprocative motion of the rocker arms driven by the crankshaft or camshaft can be adapted to open and close the electrical circuitry between the battery and solenoid valves, thereby supplying and terminating the flow of compressed air to the cylinders.

Although the use of solenoids increases the efficiency in delivering compressed air to the cylinders, operation of the solenoids by the conventional arrangement of valves, camlifters, rocker arms, springs, and the like still poses the problem of a greater probability of mechanical or material failure.

Compressed air can be supplied to the engine in a number of ways, one of which is to provide an air compressor driven by a battery and mounted on the vehicle. Naturally, the major drawback associated with this type of battery-driven air compressor is the fact that the battery will eventually require recharging or replacing, either of which may occur at a most undesirable time and place.

Another prior art method of supplying compressed air is to mount both an air compressor and a combustion engine on the vehicle frame. The fuel-driven combustion engine is connected by its crankshaft to the air compressor for the operation thereof. Again, the primary disadvantage with this type of air compressor is the undesirable use of the polluting fuel-driven combustion engine. Any use of a combustion engine defeats the purpose of a pollution-free compressed air driven vehicle.

Still another method of supplying a source of compressed air is to provide a plurality of rechargeable compressed air tanks mounted on the vehicle. The major problem associated with this type of air compressor is similar to that of the battery-operated air compressor in that continual monitoring of the system is required, i.e., the operator must continually monitor the pressure available to insure proper operation of the air driven engine. Furthermore, using rechargeable air tanks presents the possibility of the tanks requiring recharging when a source of compressed air is not available.

SUMMARY OF THE INVENTION

The present invention overcomes the problems and disadvantages of the prior art by providing an improved compressed air propulsion system for use with a vehicle.

The compressed air propulsion system of the present invention is used in combination with an engine having a piston-cylinder arrangement, and eliminates the complex arrangement of camlifters, rocker arms, springs, and the like interconnecting the valve assembly of the cylinders with the crankshaft or camshaft. The head mounted on the cylinders in the engine block has only one opening therein for each cylinder, and a single air line is connected to each opening for supplying compressed air to the respective cylinder. The respective air lines leading from the cylinders are joined to a common manifold to which the air line leading from the source of compressed air is connected. The flow of compressed air to the cylinders is controlled by a uniquely constructed air distributor system which utilizes the rotation of the distributor shaft, which is operatively coupled to the engine crankshaft or camshaft, for sequentially actuating solenoids connected to the respective air lines leading to the cylinders.

A rotor mounted on the end portion of the rotating distributor shaft sequentially and mechanically actuates a plurality of electrical microswitches, which are electrically connected to the respective solenoids. The microswitches are arranged in a generally circular array about the rotor, and upon rotation of the rotor, each microswitch is individually mechanically actuated to close a pair of spaced-apart electrical conductors therein, thereby providing current from the battery through the microswitch to its respective solenoid. The surface or contact length of the rotor, with which each microswitch is engageable, determines the length of time a microswitch will remain closed to supply current to the solenoid, thereby controlling the amount of compressed air delivered through the solenoid to its respective cylinder.

By eliminating the complex arrangement of camlifters, rocker arms, springs, and the like interconnecting the valves and camshaft or crankshaft, the air propulsion system of the present invention completely eliminates problems due to their material or mechanical failure. Moreover, in place thereof, the air propulsion system of the present invention provides a unique air distributor system for distributing the compressed air to the cylinders, and which is much less complex in construction and operation.

The air propulsion system of the present invention further includes a source of compressed air that is run neither by batteries, a combustion engine, or solely by rechargeable tanks. The source of compressed air provided by the present invention includes a transaxle mounted on the vehicle and an air compressor coupled to the output shaft of the transaxle. During movement of the vehicle, the transaxle is operated by the wheels to which it is connected and in turn operates the air compressor. Compressed air for engine start-up and engine operation when the vehicle is stationary is provided by a rechargeable air tank connected between the air compressor and engine. The rechargeable air tank is continually maintained in a charged condition by the air compressor.

In one form of the present invention there is provided a compressed air propulsion system in a vehicle comprising an engine having a plurality of cylinders slidably receiving therein a respective plurality of pistons. The engine is operatively connected to an axle of the vehicle for driving the same. A transaxle mechanism is also provided and is mounted on and driven by the vehicle, and an air compressor is coupled to the transaxle mechanism for supplying a flow of compressed air. An air line assembly leads from the air compressor to the engine for delivering compressed air thereto, and an air distributor in the air line assembly sequentially distributes compressed air to individual ones of the cylinders.

Another aspect of the present invention provides in combination with a compressed air driven vehicle including an engine having a plurality of pistons reciprocatively received in a respective plurality of cylinders, the pistons being operatively coupled to a crankshaft; a supply of compressed air; and an air line assembly connected between the supply of compressed air and the engine; an air distributor system comprising a plurality of electrically-operated valves connected between respective ones of the cylinders and the air line assembly, wherein the valves are sequentially electrically actuable to distribute compressed air to the cylinders. A plurality of electrical switches are arranged in a generally circular array and are electrically connected to respective ones of the valves for supplying electric current for the actuation thereof, and a rotor is disposed generally within the array of switches and is operatively coupled to the crankshaft to be rotated thereby. Upon rotation, the rotor is sequentially engageable with respective ones of the electrical switches to close respective ones thereof.

It is an object of the present invention to provide an improved compressed air propulsion system in a vehicle.

Another object of the present invention is to provide a unique air distributor system for sequentially distributing air to the engine cylinders.

Yet another object of the present invention is to provide an improved air distributor system comprising a plurality of electrical switches mechanically actuated by a rotatable rotor for supplying electric current to solenoids connected to respective air lines leading to the engine cylinders.

A further object of the present invention is to provide an air compressor operatively coupled to and driven by a transaxle mechanism mounted on the vehicle.

Further objects of the present invention will appear as the description proceeds.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 2 is a sectional view of the compressor in the embodiment in FIG. 1;

FIG. 3 is a broken-away side elevational view of the accelerator assembly in the embodiment in FIG. 1;

FIG. 4 is a broken-away perspective view of the vehicle engine compartment containing the engine and portions of the embodiment in FIG. 1;

FIG. 5 is a broken-away sectional view of the accelerator in the embodiment in FIG. 1;

DESCRIPTION OF A PREFERRED EMBODIMENT

Figure 1:
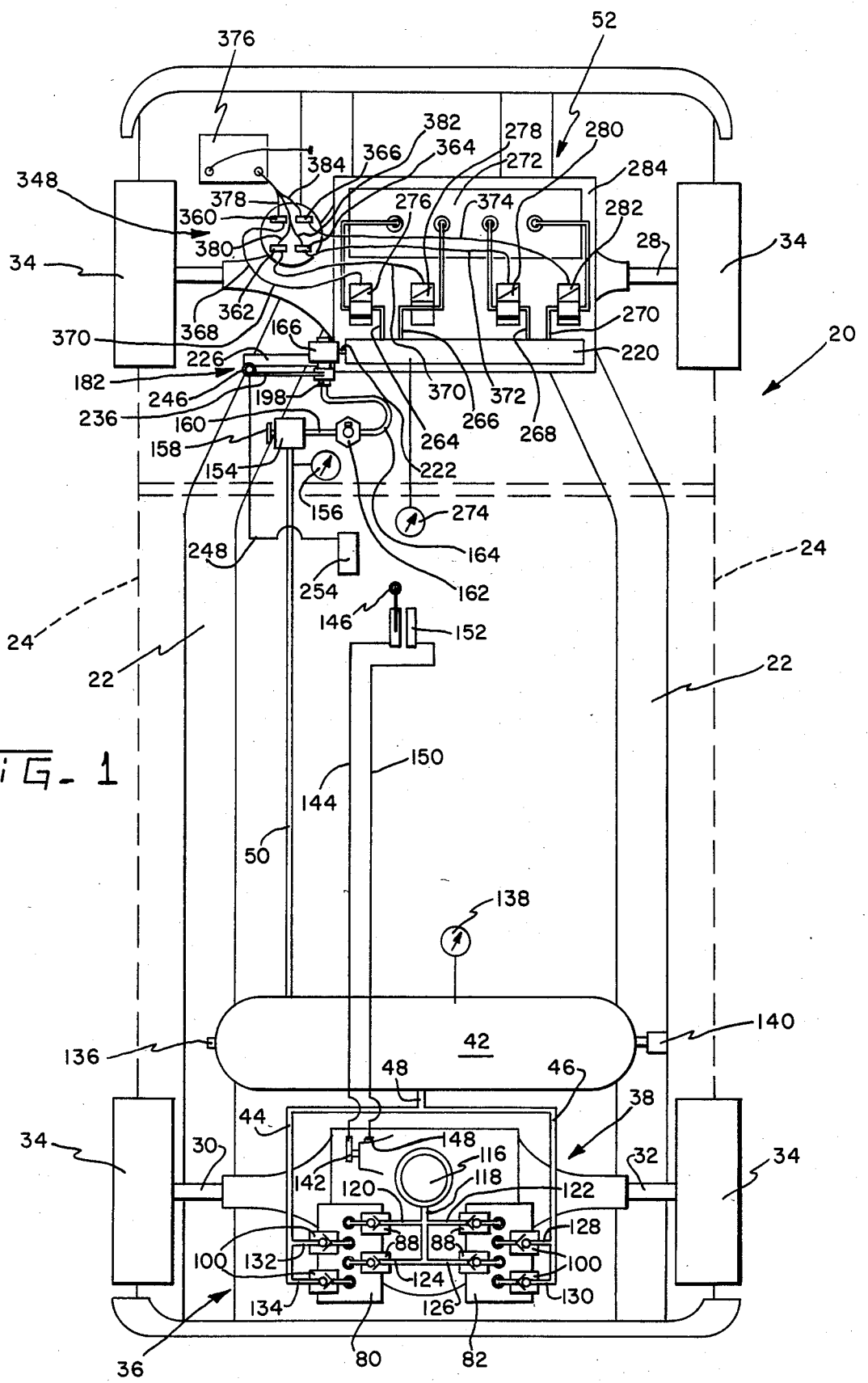
FIG. 1 is a schematic view of a preferred embodiment of the present invention.

Referring primarily to FIGS. 1 and 4, vehicle 20 is illustrated and comprises frame 22, body 24, engine compartment 26, front axle 28, rear axles 30, 32, and wheels 34 connected to axles 28, 30, 32.

Transaxle 38 is mounted in the rear of vehicle 20 and includes an output shaft (not shown) connected to crankshaft 40 (FIG. 2) of air compressor 36, and is coupled to rear axles 30,32. Air reservoir 42 is connected to air compressor 36 by air lines 44, 46, 48 and air line 50 is connected to air reservoir 42 and leads forward to engine compartment 26 for delivering compressed air to engine 52, as will be explained in greater detail hereinafter. Front axle 28 is conventionally connected to a transmission (not shown), which in turn is conventionally connected to engine 52 for driving front wheels 34.

Referring now to FIGS. 1 and 2, compressor 36 includes piston cylinder arrangement 54 coupled to transaxle 38. Piston-cylinder arrangement 54 comprises block 56 rotatably housing therein crankshaft 40, which has secured thereto cranklever 58. Block 56 further includes cylinder 60 slidably containing piston 62 and cylinder 64 slidably containing piston 66. Although FIG. 2 only illustrates two cylinders, piston-cylinder arrangement 54 may include more or fewer cylinders. Piston rod 68 is pivotally connected to piston 62 by pin 70 and is pivotally connected at its opposite end to one end of cranklever 58 by pin 72. Piston rod 74 in a like manner is pivotally connected to piston 66 by pin 76 and is pivotally connected at its opposite end to the other end of cranklever 58 by pin 78.

Each cylinder 60, 64, or a set of cylinders in a V-arrangement, has a respective head 80, 82 attached thereto. FIG. 2 illustrates head 80 sectioned to illustrate intake port 84, and head 82 sectioned to illustrate exhaust port 86 to assist in describing the structure and operation of compressor 36. However, it should be understood that each cylinder 60, 64 in compressor 36 is provided with both an intake port and exhaust port.

Intake port 84 of head 80 is provided with a one-way check valve 88 comprising connector 90 securely seated in intake port 84, and having an enlarged chamber 92 and passage 94 which communicate with intake port 84. Ball 96 is biased upwardly by spring 98 to block passage 94, the diameter of ball 96 being greater than the diameter of passage 94. As described, valve 88 will only permit the flow the compressed air in one direction, that being through passage 94 and into intake port 84 when the pressure of the air flow forces ball 96 against the spring tension of spring 98, thereby unseating ball 96 away from passage 94. When the pressure of the flow of compressed air is less than the spring tension of spring 98, ball 96 is upwardly biased against passage 94, thereby preventing reverse air flow through intake port 84 and passage 94.

In a similar manner, one-way check valve 100 permits air flow in only one direction, that being from cylinder 64 through exhaust port 86 and passage 102 of connector 104. Chamber 106 in passage 102 contains ball 108 biased downwardly against passage 102 by spring 110.

Block 56 further includes bottom plate 112 secured thereto by suitable fasteners, such as screws 114. The operation of piston-cylinder arrangement 54 is accomplished by the rotation of rear wheels 34 turning rear axles 30, 32, which are operatively coupled to crankshaft 40 by transaxle 38.

Referring to FIG. 1, air filter 116 is mounted on compressor 36 and includes air line 118 leading therefrom and between heads 80, 82. Each intake valve 88 is connected by a respective air line to air line 118; the upper left intake valve 88 being connected to air line 118 by air line 120, the upper right intake valve 88 being connected to air line 118 by air line 122, the lower left intake valve 88 being connected to air line 118 by air line 124, and the lower right intake valve being connected to air line 118 by air line 126. Although only one air filter 116 is illustrated, individual air filters may be provided for each intake valve 88.

Continuing to refer to FIG. 1, the two exhaust check valves 100 on the right side of compressor 36 are connected to air line 46 by air lines 128, 130, and the two exhaust check valves 100 on the left side of compressor 36 are connected to air line 44 by air lines 132, 134.

Compressor 36, as described, need not be limited to a piston-cylinder arrangement for providing compressed air. For example, compressor 36 may be a rotary compressor manufactured with a self-contained internal valve system and having a single compressed air discharge line connected to air line 48. Further, compressor 36 is manufactured as, or modified to be, a continuous non-oil pump compressor, which will operate to provide compressed air whether vehicle 20 is moving forward or in reverse. The non-oil pump compressor refers to a compressor which is lubricated by an oil slinger device connected to the crankshaft. Upon rotation of the crankshaft, the oil slinger device is rotated through the oil sump and throws oil toward cavities machined in the compressor block or crankcase. The cavities include oil passages leading to bearings and other moving parts for providing lubrication thereof. Compressor 36 is capable of providing compressed air at a pressure of about 1000-1100 pounds per square inch.

Air reservoir 42 is mounted just forward of compressor 36 on frame 22 and includes external connection 136, which can be used, if necessary, to charge reservoir 42 with compressed air, air pressure gauge 138, and relief valve 140. Air pressure gauge 138 registers the pressure within reservoir 42 and may be located in either the trunk or on the dashboard in view of the vehicle operator. Air reservoir 42 is designed and constructed to contain compressed air at a pressure of at least 1500 psi, and relief valve 140 is designed to open when the air pressure exceeds 1500 psi.

Transaxle 38 includes gear shift link 142 connected by control cable 144 to gear shift lever 146 near the vehicle operator, and clutch link 148 connected by cable 150 to clutch 152, also near the vehicle operator. Clutch 152 can be designed to be either hand or foot operated, and allows gear shift link 142 to shift transaxle 38 between high and low gears. Gear shift lever 146 shifts transaxle 38 between high gear and low gear either to decrease or increase the output of compressor 36. For example, during acceleration or travel up steep inclines, low gear would be selected to increase the output of compressor 36, while high gear would be selected to maintain a steady-state velocity along a level or less hilly road. Preferably, the low gear supplies twice as much compressed air as does high gear. Naturally, should compressor 36 be replaced by some other suitable compressor, it should also be capable of supplying a variable amount of compressed air. In this embodiment, transaxle 38 was removed from a Volkswagon Beetle and mounted on vehicle 20, and fourth gear is used as the high gear and third gear as the low gear.

Referring now to FIGS. 1 and 4, air line 50 leads from compressor 36 into engine compartment 26 and is connected to regulator 154, which is a manually operated valve for regulating the air pressure delivered to engine 52. Air pressure gauge 156 is connected to air line 50 to indicate the air pressure at the inlet side of regulator 154. Regulator 154 is manually adjusted by handle 158 and compressed air delivered therefrom passes through airline 160 to oiler 162, and thence through flexible hose 164 to accelerator 166.

Referring to FIGS. 1 and 4, oiler 162 comprises container 168 having an opening (not shown) in the bottom thereof with drain valve 170 disposed therein. Container 168 is filled with a suitable lubricant, and drain valve 170 is utilized to drain old lubricant from container 168. Cover 172 is attached to container 168 by screws 174 and includes a hollow tubular portion 176 to which is connected air line 160 and flexible hose 164. Cover 172 includes an opening (not shown) with a filler cap 178 disposed therein, and is used to refill container 168 with lubricant. An adjusting valve 180 is disposed in hollow tubular portion 176 and is utilized to regulate the flow of lubricant delivered from oiler 162 into flexible hose 164 and thence through accelerator 166 to the cylinders of engine 52. In this embodiment, oiler 162 is adjusted to provide 38 drops of lubricant per hour for lubricating moving parts and other assemblies downstream of oiler 162. Oil added to the compressed air system does not enter the oil sump of engine 52 and is exhausted through the exhaust system of vehicle 20. Lubricant provided by oiler 162 is in addition to the conventional lubrication system of vehicle 20. Oiler 162 can be a type 041-2 oiler manufactured by the Norgren Company of Denver, Colo., and is generally used for pneumatic tools and generally referred to as an "automatic machine oiler."

Referring now to FIGS. 1, 3, 4, 5, and 6, accelerator assembly 182 will be described. Accelerator 166 comprises an outer housing 184 having a generally cylindrically shaped interior 186. One end of outer housing 184 has opening 188, which has a diameter the same as the diameter of interior 186, and a smaller opening 190 in the other end thereof; and further includes hole 192 radially disposed therein.

Rotatably received in interior 186 is accelerator valve 194 having a pair of smaller ends 196, 198 extending axially therefrom. End 198 is rotatably received through opening 190, and end 196 is rotatably received in closed opening 200 of cover 202. Cover 202 is secured to outer housing 184 by fasteners, such as screws 204. A pair of washers 206, 208 are disposed between radially extending shoulder 210 and cover 202 and between radially extending shoulder 212 and annular surface 214 of outer housing 184.

Valve 194 also includes a plurality of grooves 216 containing a respective plurality of O-rings 218.

Accelerator 166 is connected to manifold 220 of engine 52 by air line 222, which is threadedly secured in hole 192 in outer housing 184 and opening 224 in manifold 220. Outer housing 184 is also secured to an L-shaped bracket 226, which is secured to engine 52.

Accelerator valve 194 further includes air passage 228 having an axially extending portion 230 that extends through end 198 and into the central interior of valve 194, and a radially extending portion 232, which has an inner diameter of about ⅜ (three-eighths) of an inch and which can be rotated to be axially aligned with opening 234 of air line 222. Flexible hose 164 is connected to portion 230 of air passage 228 for delivering compressed air thereto.

Figure 6:
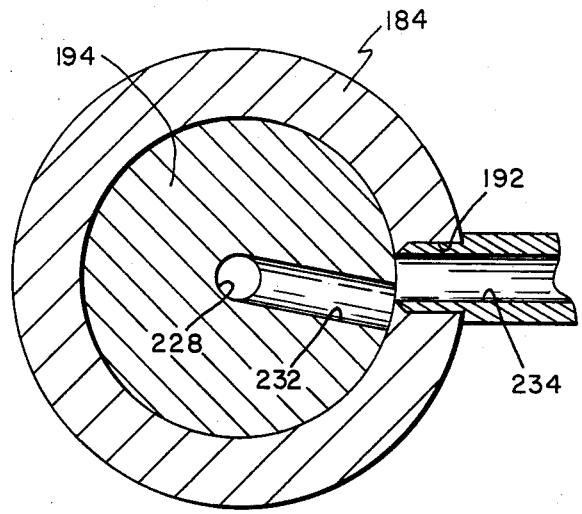
FIG. 6 is a sectional view of FIG. 5 taken along line 6—6 and viewed in the direction the arrows.

Lever 236 has a generally circularly shaped end 238 and is secured to accelerator valve end 198 by screw 240 received through hole 242 in end 238 and threadedly secured in threaded opening 244 in end 198. Lever 236 has its opposite end formed into an eye 246 for connecting accelerator cable 248 thereto. Accelerator cable 248 comprises a hollow sheath 250, which is connected at one end thereof to flange 252 of bracket 226 and at its opposite end near accelerator pedal 254. A cable 256 is slidably received in sheath 250 and has one end thereof received through eye 246 with a fastener 258 secured thereto by set screw 260. A spring 262 is slidably received over cable 256 and disposed between lever 236 and flange 252 to bias lever 236 upwardly as viewed in FIG. 3. The opposite end of cable 256 is connected to accelerator pedal 254. By depressing pedal 254, cable 256 pulls downwardly on lever 236 to rotate accelerator valve 194 in outer housing 184. Rotation of valve 194 selectively moves portion 232 of air passage 228 between a position where it is unaligned with opening 234 of air line 222 and a second position wherein portion 232 and opening 234 are coaxially aligned. FIG. 6 illustrates a partial alignment between portion 232 and opening 234 to illustrate the manner in which the flow of compressed air through accelerator 166 can be selectively varied by the operator. Upon release of accelerator pedal 254, spring 262 biases lever 236 upwardly to its original position. The alignment of portion 232 and opening 234 is adjusted so that there is partial alignment between the two when accelerator pedal 254 is not depressed, thereby providing a flow of compressed air to permit engine 52 to idle.

Referring to FIGS. 1, 4, 7, 8, and 9, manifold 220, which is connected to air line 222 leading from accelerator 166, is mounted on engine 52 and has four air lines 264, 266, 268, 270 connected thereto and leading to engine head 272. An air pressure gauge 274 is connected to manifold 220 to indicate to the vehicle operator the air pressure therein. The preferred air pressure in manifold 220 for engine 52 of the present embodiment is between about 125 psi to 170 psi. Naturally, this range of air pressure will vary depending on the particular type of engine used.

In this particular embodiment, engine 52 is a 1975 Volkswagon Rabbit 4-cylinder engine having a cubic inch displacement of 90 CID and of the engine family 32NC. Other engines can naturally be used, however, the air pressures and other parameters and specifications disclosed herein pertain to this particular type of engine 52.

The inner diameters of air lines 264, 266, 268, 270 is about 9/32 (nine-thirty secondths) inch, and they have coupled therein respective 12 volt solenoids 276, 278, 280, 282.

Engine 52 comprises engine block 284, crankcase 286, crankshaft 288 rotatably mounted in crankcase 286 by journals 290, 292, and cylinders 294, 296, 298, 300 having reciprocatively received therein pistons 302, 304, 306, 308, respectively. Pistons 302-308 are conventionally connected pivotally to rods 310, which are conventionally connected pivotally to respective crankarms 312 of crankshaft 288. Each cylinder 294-300 includes a respective exhaust port 314, 316, 318, 320, which have a diameter of about 9/16 (nine-sixteenths) of an inch. Crankshaft 288 is connected to the transmission (not shown) for driving front axle 28 and front wheels 34.

It should be noted that exhaust ports 314-320 are radially disposed in respective cylinders 294-300 at a point where exhaust ports 314-320 are just slightly above the top surfaces of respective pistons 302-308 when the pistons are at the bottom of their power strokes.

Figure 7:
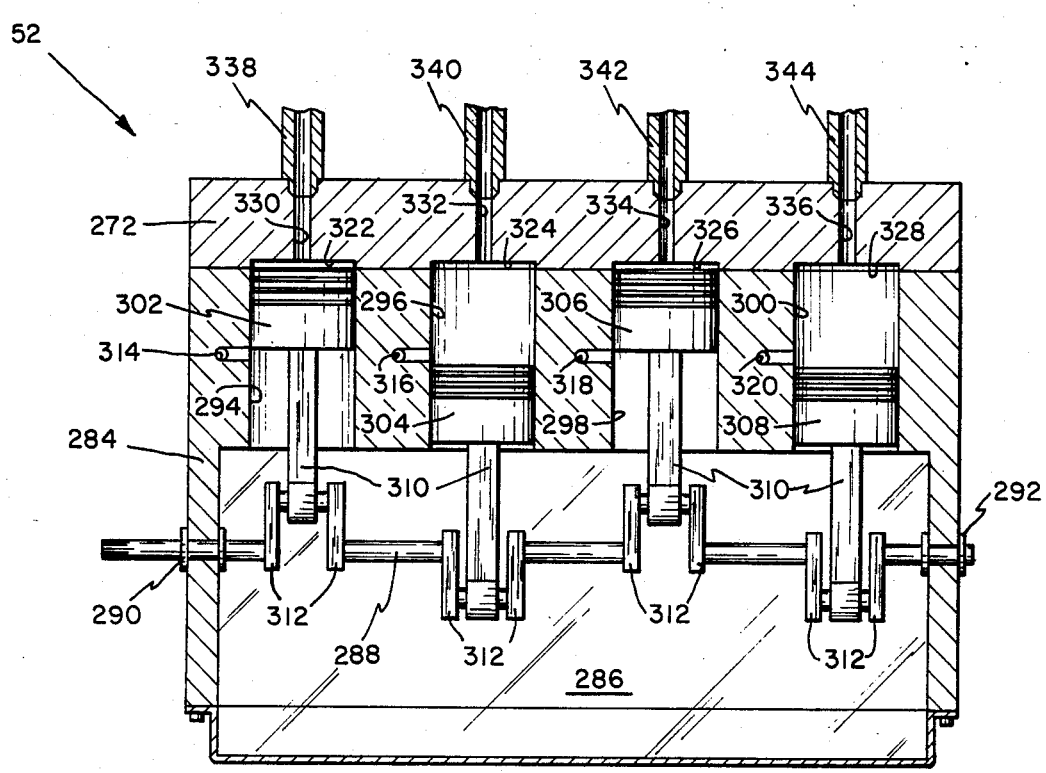
FIG. 7 is a broken-away sectional view of the engine in the embodiment in FIG. 1.
Figure 8:
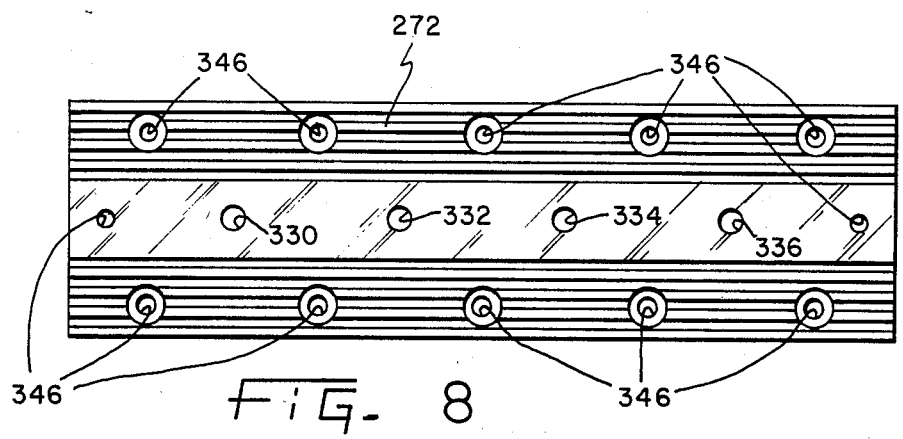
FIG. 8 is top plan view of the head for the engine in FIG. 7.
Figure 9:
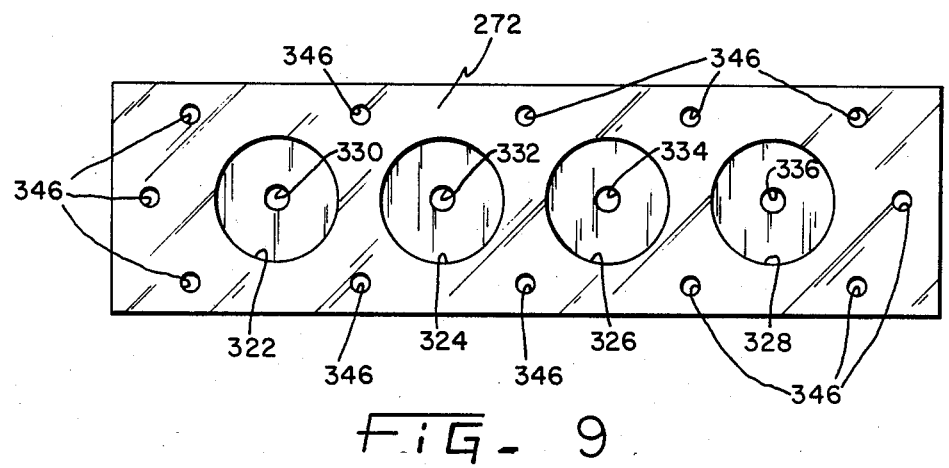
FIG. 9 is bottom plan view of the head in FIG. 8.
Figure 10:
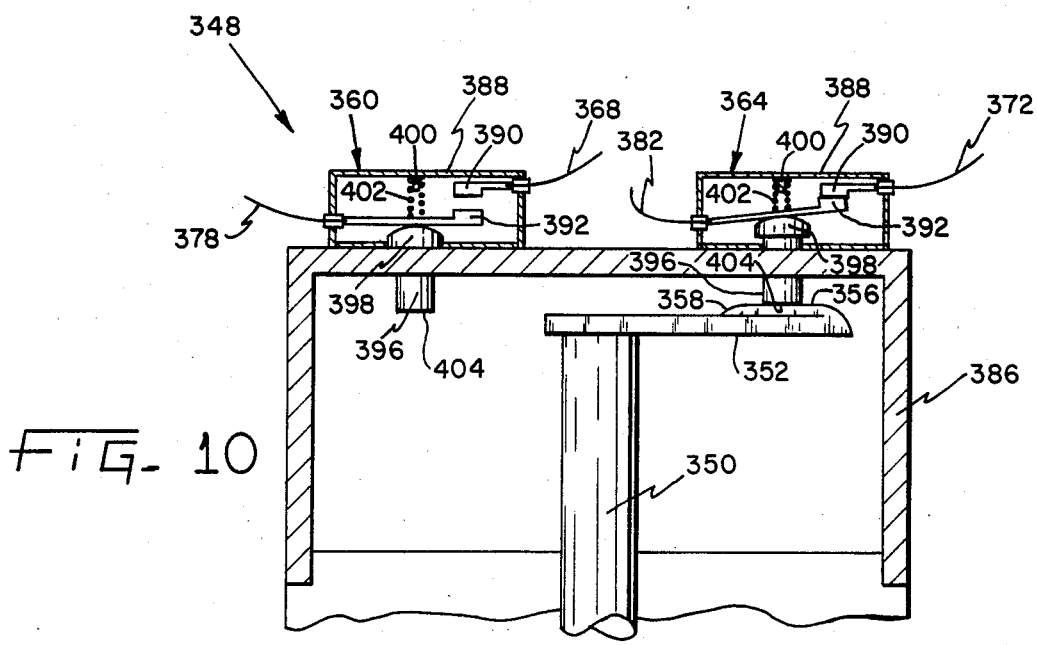
FIG. 10 is a broken-away sectional view of the distributor in the embodiment in FIG. 1.

Referring primarily to FIGS. 7, 8 and 9, engine head 272 includes annular recesses 322, 324, 326, 328, which are respectively aligned with cylinders 294, 296, 298, 300. Recesses 322-328 include respective openings 330, 332, 334, 336, and in which are tightly secured respective connectors 338, 340, 342, 344 for connecting air lines 264-270 to head 272. Head 272 also includes holes 346 for receiving therethrough suitable fasteners for rigidly securing head 272 to engine block 284.

Referring to FIGS. 1, 4, 10-13, air distributor assembly 348 comprises distributor shaft 350 (FIG. 10) conventionally coupled to crankshaft 288 of engine 52 to be rotated thereby, and rotor 352 secured to distributor shaft 350 to rotate therewith. Unique to the invention is the absence of the usual condenser and points in a conventional distributor for sequentially supplying electric current to the spark plugs of a conventional engine.

Figure 11:
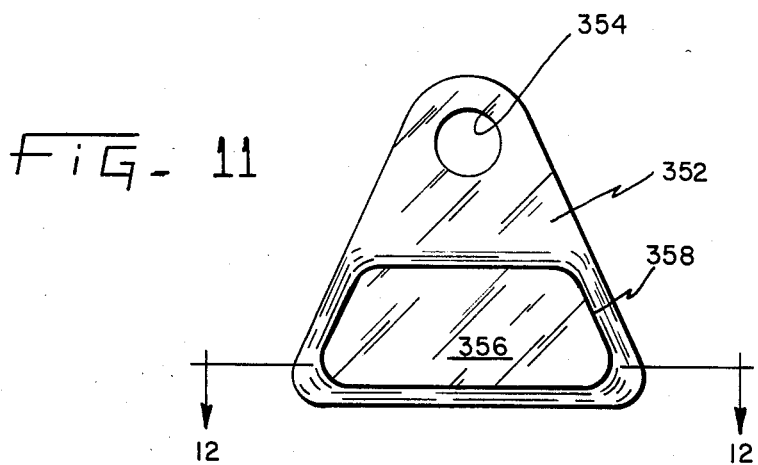
FIG. 11 is a top plan view of the rotor used in the accelerator in FIG. 10.
Figure 12:
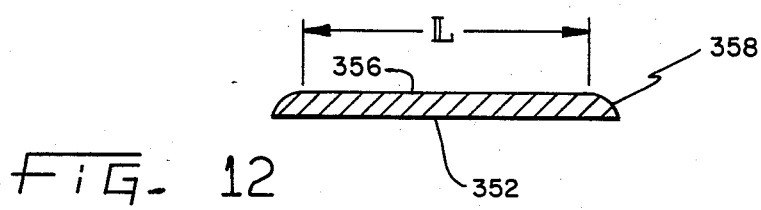
FIG. 12 is a sectional view of FIG. 11 taken along line 12—12 and viewed in the direction of the arrows.
Figure 13:
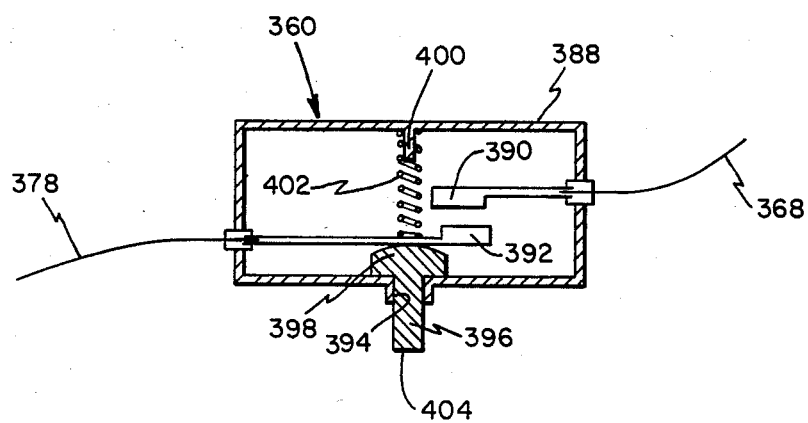
FIG. 13 is a broken-away sectional view of a microswitch in the accelerator in FIG. 10.

Referring to FIGS. 11 and 12, rotor 352 is generally triangular in shape and includes hole 354 for connecting rotor 352 to distributor shaft 350 and an elevated or raised camming surface 356, which includes a sloping peripheral portion 358. Upon rotation of rotor 352, camming surface 356 mechanically actuates four microswitches 360, 362, 364, 366, which are respectively electrically connected to solenoids 276, 278, 280, 282 by electrical lines 368, 370, 372, 374, respectively. Microswitches 360-366 are also electrically connected to battery 376 by electrical lines 378, 380, 382, 384, respectively.

Microswitches 360-366 are mounted on distributor cover 386 and are generally circularly arrayed about distributor shaft 350 and rotor 352. Referring to FIG.

13, since microswitches 360-366 are identical, only microswitch 360 will be described. Microswitch 360 comprises an outer shell 388 having a pair of spaced-apart electrical conductors 390, 392 mounted on opposite sides thereof by any suitable fastening means. Electrical conductor 392 is made of a resilient material and has electrical line 378 electrically connected thereto, and electrical conductor 390 has electrical line 368 connected thereto. Shell 388 includes opening 394 and a pin member 396 slidably received therein. Pin member 396 has an enlarged head portion 398, which supports pin member 396 in shell 388 and which is also in close proximity to or slightly abutting against electrical conductor 392. Directly above pin member 396 is spring guide 400 attached to or integral with shell 388, and spring 402 is received over spring guide 400 and abuts against shell 388 and the top of electrical conductor 392 so as to bias conductor 392 away from conductor 390, thereby maintaining conductor 390, 392 in a spaced-apart relation with no external force applied to pin member 396. Pin member 396 includes cam follower surface 404 engageable by camming surface 356 and sloping peripheral portion 358.

In operation, rotation of rotor 352 will cause sloping peripheral portion 358 and camming surface 356 to sequentially engage and move respective pin members 396 of microswitches 360-366 upwardly to force electrical conductors 392 to electrically contact electrical conductors 390, thereby sequentially closing the circuit between the battery 376, and respective solenoids 276-282. In this particular embodiment, solenoids 276-282 are required to be open for a time interval of approximately five milliseconds to provide a sufficient amount of compressed air to enter respective cylinders 294-300. The time interval of five milliseconds during which solenoids 276-282 are open is a function of the period of time during which electrical conductors 390 and 392 are in contact. The length L of camming surface 356 determines the time interval during which a respective pin member 396 is forcibly engaged by camming surface 356. Of course, the duration during which solenoids 276-282 remain open can be increased or decreased by lengthing or shortening the length L of camming surface 356. Perferably, rotor 352 and pin member 396 are made of Bakelite or a similar material.

As earlier mentioned, lubrication of the air propulsion system is accomplished by oiler 162 which delivers oil to lubricate accelerator 166, solenoids 276-282, and cylinders 294-300 and pistons 302-308. The oil is then exhausted through exhaust ports 314-320. Although not necessary to the operation of vehicle 20, an exhaust manifold (not shown) may be connected to exhaust ports 314-320, and a tail pipe and muffler system (not shown) may also be utilized with vehicle 20.

It can also be seen now that no pollution control devices are required with vehicle 20 since engine 52 is operated by compressed air rather than by fuel combustion. It should also be pointed out that vehicle 20 utilizes other standard features or accessories of a typical vehicle, such as a transmission, brake system, lighting system, and the like, except that vehicle 20 does not require a radiator for cooling engine 52.

In operation, vehicle 20 is initially started the same as a conventional vehicle in that a starter (not shown) is utilized to crank engine 52, thereby rotating distributor shaft 350 and rotor 352 in order to sequentially supply electrical current to solenoids 276-282. Since air reservoir 42 is maintained in a charged condition, engine 52 can be started by depressing accelerator pedal 254, thereby permitting a flow of compressed air from reservoir 42 through air line 50, regulator 154, oiler 162, accelerator 166, and into manifold 220. From manifold 220, the flow of compressed air is then sequentially delivered to cylinders 294-300 by solenoids 276-282. When engine 52 is running, alternator 406, which is conventionally coupled thereto, is operated to continually charge battery 376. Vehicle 20 is then driven in the normal manner using accelerator pedal 254 and the conventional automatic or manual transmission. If required for greater acceleration, or in traveling in hilly areas, clutch 152 can be used to allow gear shift lever 146 to operate gear shift link 142 to shift transaxle 38 from high gear to low gear. When vehicle 20 is in motion, the rotation of rear wheels 34 will rotate rear axles 30, 32, which rotation is transferred by transaxle 38 to compressor 36, which will then supply a flow of compressed air to engine 52 and maintain air reservoir 42 in a charged condition.

Compressed air delivered to cylinders 294, 296, 298, 300 is exhausted through respective ports 314, 316, 318, 320 when the top surfaces of respective pistons 302, 304, 306, 308 are below the level of their respective ports 314-320. An exhaust manifold and exhaust pipe (not shown) then deliver the exhausted air to the atomsphere.

Engine shut down is performed in the usual manner by turning the ignition system (not shown) off, thereby removing electrical current from air distributor system 348.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice within the art to which this invention pertains and falls within the limits of the appended claims.

What is claimed:

1. A compressed air propulsion system for a vehicle, comprising:

an engine including a plurality of cylinders reciprocatingly receiving therein a respective plurality of pistons, and an exhaust means connected to said cylinders, said engine drivingly connected to an axle of said vehicle to propel said vehicle;

a transaxle operatively mounted on and rotatably driven by said vehicle;

air compressing means rotatingly driven by said transaxle for supplying a flow of compressed air to an air reservoir;

an air supply line connecting said air reservoir to said engine for supplying compressed air thereto;

an air distributor connected to said air supply line and said cylinders and including a rotor operatively coupled to said pistons for sequentially actuating a plurality of solenoid valve means to sequentially supply compressed air to individual ones of said cylinders;

accelerator means including a housing having an opening therein and connected to said air reservoir by said air line, a valve member received in said housing and having an air passage therein connected to said engine by said air line, said valve member selectively adjustable in said housing between a first position wherein said opening and said air passage are unaligned and a second position wherein said opening and said air passage are aligned, the alignment of said opening and air passage being adjustable to vary the flow rate of compressed air therethrough;

said air distributor including a plurality of electrical switch means, each said electrical switch means comprising; a pair of spaced-apart electrical conductors, one of said electrical conductors being electrically connected to a respective one of said plurality of solenoid valve means; and cam follower means engageable by a camming surface of said rotor for mechanically moving a first one of said electrical conductors between a first position wherein said first one of said electrical conductors is spaced apart from the second one of said electrical conductors and a second position wherein said first one of said electrical conductors is in electrical contact with said second one of said electrical conductors, whereby said respective one of said solenoid valve means is electrically actuated when said cam follower means mechanically moves said first one of said electrical conductors into electrical contact with said second one of said electrical conductors.

2. The system of claim 1 wherein said air compressing means is a continuous non-oil pump compressor.

3. The system of claim 1 wherein said exhaust means comprises a plurality of exhaust ports respectively disposed in said cylinders, each said exhaust port being radially disposed in a lower portion of a respective said cylinder, said lower portion being just slightly above the top surface of the respective said piston when said piston is at the bottom of its stroke.

4. The vehicle of claim 1 further comprising a manifold connected to said air supply line means between said accelerator means and said plurality of valve means, and having a plurality of air conduits leading therefrom, said plurality of valve means being connected between respective ones of said cylinders and respective ones of said air conduits.

5. The vehicle of claim 1 wherein said accelerator housing is stationary and generally cylindrically shaped with said opening being radially disposed therein, said valve member being rotatable and said air passage being radially disposed in said valve member.

6. A compressed air propulsion system for a vehicle, comprising:

an engine including a plurality of cylinders reciprocatingly receiving therein a respective plurality of pistons, and an exhaust means connected to said cylinders, said engine drivingly connected to an axle of said vehicle to propel said vehicle;

a transaxle operatively mounted on and rotatably driven by said vehicle;

air compressing means rotatingly driven by said transaxle for supplying a flow of compressed air to an air reservoir;

an air supply line connecting said air reservoir to said engine for supplying compressed air thereto;

an air distributor connected to said air supply line and said cylinders and including a rotor operatively coupled to said pistons for sequentially actuating a plurality of solenoid valve means to sequentially supply compressed air to individual ones of said cylinders;

accelerator means including a housing having an opening therein and connected to said air reservoir by said air line, a valve member received in said housing and having an air passage therein connected to said engine by said air line, said valve member selectively adjustable in said housing between a first position wherein said opening and said air passage are unaligned and a second position wherein said opening and said air passage are aligned, the alignment of said opening and air passage being adjustable to vary the flow rate of compressed air therethrough;

said air distributor including a plurality of electric switches, each of said switches including a pair of electrical conductors, one of said conductors being electrically connected to a respective one of said solenoid valve means; and a cam follower element engageable by said rotor for moving a first one of said electrical conductors between an open position wherein said first one of said electrical conductors is spaced apart from the second one of said electrical conductors and a closed position wherein said first one of said electrical conductors is in electrical contact with said second one of said electrical conductors to supply electrical current to a respective one of said valve means, said rotor including a contoured camming surface engageable with said cam follower element when rotated by said pistons; said camming surface moving said cam follower element between a first position wherein cam follower element is at least adjacent to said first one of said electrical conductors at said open position and a second position wherein said cam follower element forcibly abuts against said first one of said electrical conductors to move said first one of said electrical conductors from said open position to said closed position.

7. The vehicle of claim 6 wherein the length of said camming surface engageable by said cam follower element is predetermined by the length of time during with each said valve means is open to distribute compressed air to its respective said cylinder.

* * * * *